April 5, 1927.

C. D. SCHMIDT 1,623,706

BRAKE OR CLUTCH

Original Filed May 16, 1922

INVENTOR
Charles D. Schmidt
BY
Edwards, Sager & Bower
his ATTORNEYS

Patented Apr. 5, 1927.

1,623,706

UNITED STATES PATENT OFFICE.

CHARLES D. SCHMIDT, OF JAMAICA, NEW YORK.

BRAKE OR CLUTCH.

Original application filed May 16, 1922, Serial No. 561,350. Divided and this application filed April 10, 1924. Serial No. 705,479.

This invention relates to brakes or clutches of automotive vehicles and the like and particularly to the cooling of the brake or clutch to protect it from overheating and burning. The usual brake or clutch is provided with a replaceable lining of woven material such as asbestos or cotton or a mixture with which is intermingled metal strands, the whole being impregnated with a rubberized compound; or sometimes a fibre material is used. These flat bands or brake lining are fastened to the brake bands or the brake drum shoes by means of rivets or the like and the heat generated during the braking action is more or less confined to the body of the brake lining and directly transmitted to the shoe or band.

The main object of this invention is to provide a brake or clutch in which the lining is air cooled.

A further object of the invention is to provide a lining which will contact only at intervals with its supporting band so that the lining will be permitted to adapt itself more readily to the formation of the drum so as to give a more homogeneously braking effect.

In the accompanying drawings illustrating the invention—

Figure 1:
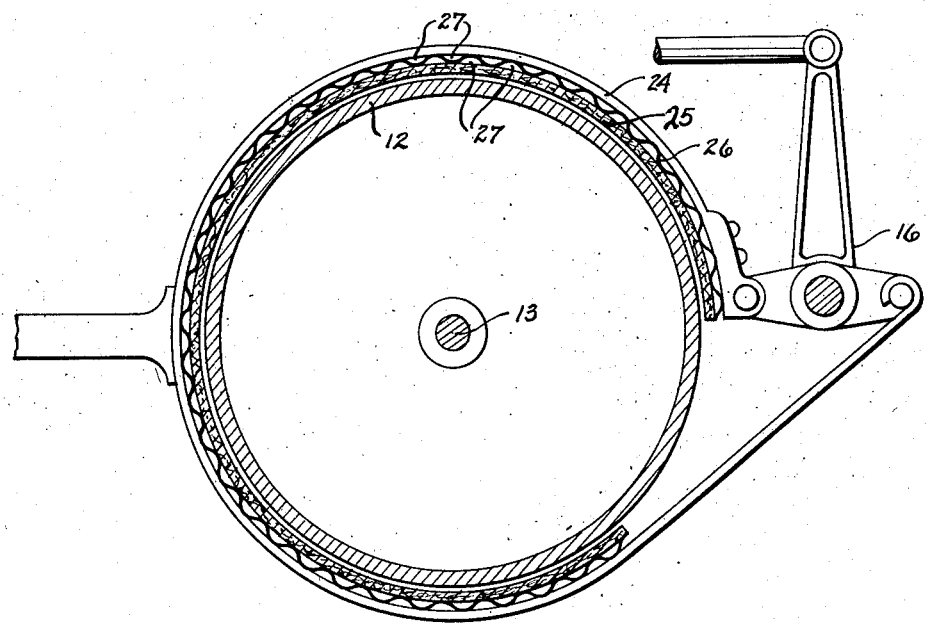
Fig. 1 is a diagrammatic sectional view of a brake having an outer band provided with an air cooled lining.
Figure 2:
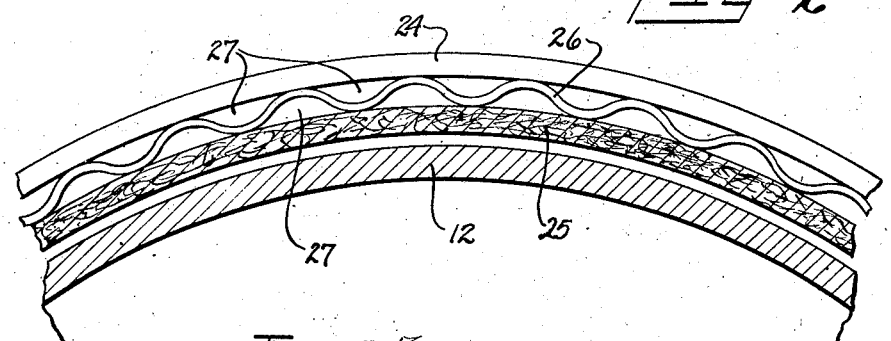
Fig. 2 is a plan view of the air cooled surface of the lining shown in Fig. 1.
Figure 3:
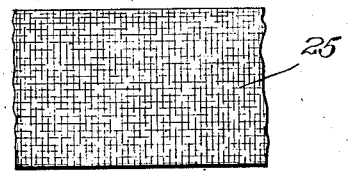
Fig. 3 is a plan view of the surface of the lining shown in Figs. 1 and 2.

In the specific embodiment of the invention illustrated in Fig. 1 a brake drum 12 rotating on the shaft 13 is provided with an outer flexible band 24 carrying a brake lining 25 which is drawn against the periphery of the drum by the operating mechanism 16 as shown.

The brake band 24 has interposed between it and the lining 25 a corrugated strip of metal 26 so that all the channels or spaces 27 will serve for air circulation for cooling the brake band and the lining. The outer surface of the lining has its area in contact with the air increased so that the circulation of the air will provide an additional cooling effect tending to maintain a lower temperature of the lining and avoid overheating and burning. The form of the air spaces may be any design that will effect less contact of the surface of the lining with the part to which it is fixed, while the other or braking side preferably has a flat surface and full bearing area. All of these designs provide air spaces between the brake lining and the part to which it is fixed so as to introduce an air cooling effect.

The formation of the lining so as to contact only at intervals with the supporting band also permits the lining to adapt itself more readily to the formation of the drum so as to give a more homogeneously distributed braking effect. The intervals of contact are relatively closely spaced, the length of each interval being less than the width of the lining. At these intervals the supporting pressure on the back surface of the lining is localized effecting a concentration of the supporting pressure at said intervals of contact. Wherever any irregularities occur so as to concentrate the pressure at a given area of the lining, the lining will be permitted to yield readily under this localized concentration of pressure so as to substantially equalize the pressures throughout the face of the lining and the face of the drum and giving a full efficient braking action without chattering. While the invention has been described in connection with a specific form, it is not confined thereto but is intended to cover such variations as fall within the scope of the appended claims, it being obvious that the lining of this invention may also be used in an internal expanding brake or with a clutch.

This application is a division of my copending application Serial No. 561,350, filed May 16, 1922.

I claim:—

1. In a brake or clutch the combination with a lining, of a supporting means therefor concentrating the supporting pressure at intervals shorter than the width of the lining to permit the lining to adapt itself more readily to the formation of the drum.

2. In a brake or clutch the combination with a lining, of a flexible supporting means therefor concentrating the supporting pressure at intervals shorter than the width of the lining to permit the lining to adapt itself more readily to the formation of the drum.

3. In a brake or clutch having braking surfaces of generally circular form the combination with a lining, of a supporting means therefor concentrating the supporting pressure at intervals while preserving the arcuate form of the braking surface of the lining so that the lining will adapt itself more readily to the circular formation of the drum.

4. In a brake or clutch having braking surfaces of generally circular form the combination with a lining, of a supporting means therefor concentrating the supporting pressure at intervals while preserving the arcuate form of the braking surface of the lining so that the lining will adapt itself more readily to the circular formation of the drum, a said supporting means comprising a supporting member and a corrugated strip of metal between the supporting member and the lining and in contact with said lining.

5. In a brake or clutch the combination with a lining, of a supporting means therefor comprising a metal band having bent portions contacting with the lining at intervals to concentrate the supporting pressure at separated areas and permit the lining to adapt itself more readily to the formation of the drum.

6. In a brake or clutch the combination with a lining, of a supporting means therefor comprising a band and an intermediate strip supported by said band and in turn supporting the lining, said strip being bent to contact with the band at intervals so as to form a resilient intermediate member permitting the lining to adapt itself more readily to the formation of the drum.

7. In a brake or clutch the combination with a lining, of a supporting means therefor comprising a band and an intermediate strip supported by said band and in turn supporting the lining, said strip being bent to contact with said band and lining at intervals so as to concentrate the supporting pressure and permit the lining to adapt itself more readily to the formation of the drum.

8. In a brake or clutch the combination with a lining, of a supporting means therefor comprising a band and an intermediate strip supported by said band and in turn supporting the lining, said strip being bent to contact with said lining at intervals so as to concentrate the supporting pressure at separated areas and permit the lining to adapt itself more readily to the formation of the drum.

CHARLES D. SCHMIDT.